United States Patent [19]

Ritakallio

[11] Patent Number: 5,032,143
[45] Date of Patent: Jul. 16, 1991

[54] METHOD AND APPARATUS FOR TREATING PROCESS GASES

[75] Inventor: Pekka Ritakallio, Hämeenlinna, Finland

[73] Assignee: A. Ahlstrom Corporation, Finland

[21] Appl. No.: 288,038

[22] PCT Filed: Apr. 20, 1988

[86] PCT No.: PCT/FI88/00057
§ 371 Date: Dec. 15, 1988
§ 102(e) Date: Dec. 15, 1988

[87] PCT Pub. No.: WO88/08741
PCT Pub. Date: Nov. 17, 1988

[30] Foreign Application Priority Data
May 8, 1987 [FI] Finland ................. 872053

[51] Int. Cl.$^5$ ............... B01D 5/00; B01D 7/00; C22B 5/14; F27B 15/10
[52] U.S. Cl. ............... 23/313 FB; 55/69; 75/444; 422/145; 423/210; 423/215.5; 423/DIG. 16
[58] Field of Search ............... 23/313 FB; 55/28, 69, 55/74, 83, 340; 422/145; 423/210, 215.5, 245.1, DIG. 16, 45; 75/444, 451

[56] References Cited

U.S. PATENT DOCUMENTS

| | | | |
|---|---|---|---|
| 2,580,635 | 1/1952 | Winter | 55/69 |
| 2,583,013 | 1/1952 | Patterson | 55/82 |
| 2,721,626 | 10/1955 | Rick | 55/69 |
| 3,977,846 | 8/1976 | Russell et al. | 55/79 |
| 4,120,668 | 10/1978 | Fraley | 55/72 |
| 4,315,758 | 2/1982 | Patel et al. | 48/197 R |
| 4,334,898 | 6/1982 | Zhuber-Okrog et al. | 423/DIG. 16 |
| 4,351,275 | 9/1982 | Bhojwani et al. | 422/145 |
| 4,391,880 | 7/1983 | Tsao | 423/659 |
| 4,416,857 | 11/1983 | Vorres | 48/63 |
| 4,435,364 | 3/1984 | Vorres | 48/63 |
| 4,509,436 | 4/1985 | Schroefelbauer et al. | 110/345 |
| 4,539,188 | 9/1985 | Hirsch et al. | 423/210 |

FOREIGN PATENT DOCUMENTS

| | | |
|---|---|---|
| 42638 | 6/1981 | European Pat. Off. . |
| 3439600 | 5/1986 | Fed. Rep. of Germany . |
| 64997 | 10/1983 | Finland . |
| 71072 | 11/1986 | Finland . |
| WO86/01822 | 3/1986 | PCT Int'l Appl. . |
| 516745 | 5/1978 | U.S.S.R. ............... 75/444 |

Primary Examiner—Jeffrey E. Russel
Attorney, Agent, or Firm—Nixon & Vanderhye

[57] ABSTRACT

A method of treating process gases by cooling the process gas in the reactor so as to bring the process gas into contact with fluidized solid particles which are separated from the process gas after treating and mainly recirculated back to the reactor, in which method the process gas to be treated is mixed either simultaneously or at a short interval with both recirculated solid particles and gas, which gas, at least partly, is process gas which has been treated and from which solid particles have been separated after treatment, and in which method at least one of the components, i.e. solid particles or gas, to be mixed with the treated gas is cooler than the process gas to be treated. An apparatus for treating process gases by cooling the process gas in the presence of solid particles, which apparatus comprises a vertical reactor, at the bottom of which there is an inlet opening for the process gas, and in which apparatus a mixing chamber is fitted to the reactor, said mixing chamber having a conical bottom tapering downwards with at least one inlet opening disposed low at the conical bottom or in the immediate vicinity thereof, which opening is intended for a gas to be mixed with the process gas or for an evaporating liquid and in which apparatus at least one inlet pipe for solid particles is fitted to the wall or conical bottom of the mixing chamber.

24 Claims, 6 Drawing Sheets

METHOD AND APPARATUS FOR TREATING PROCESS GASES

The present invention relates to a method and apparatus for treating process gases by cooling the process gas in the presence of solid particles.

Different high-temperature processes such as melting of ores or metal concentrates and processes with melting, reduction and fuming of metallurgical slags, calcination of cements, high-temperature processes in the chemical industry, etc. generate high-temperature gases containing components that tend to stick to the heat transfer surfaces, thus making the heat recovery from said gases as well as cooling of them difficult. Sticky compounds may also be generated in ordinary gasifying processes. Such compounds that foul heat transfer surfaces are, for example compounds that evaporate in the process and condensate or sublimate by cooling,
molten drops that solidificate by cooling,
particles that tend to sinter,
fume or aerosol, characterized by a very small particle size, usually less than 1 micron, and by a tendency to stick to other fume particles and surfaces met with,
molten or solid compounds resulting from chemical or other reactions.

Depending on the case, a process gas may contain one or more of the components mentioned above. Their common feature is a tendency to stick to the heat transfer surfaces of the heat exchanger or the boiler when the gas flows through them.

As a result of this, the heat exchanger gradually becomes clogged thus losing its effect, which usually results in running down the process.

The harmful effects of fouling can, in many cases, be reduced by different kinds of blow sweepers or mechanical sweepers such as shakers or blow hammers. The blow sweepers have a disadvantage of consuming high-pressure steam and their sweep gas affecting the composition of the gas to be treated. For reducing gases, for example, air cannot normally be used.

Shakers and blow hammers have proved to be an effective sweeping method under various conditions. Their disadvantage is the restrictions set by them on the boiler structure. Furthermore, shakers are ineffective on superheaters in operation.

Experience has shown that, usually the fouling problem is greatest at a certain temperature range typical to the process where the sintering tendency of "dust" is highest. The reasons affecting such temperature range are explained more in detail in the following.

The following factors, among other things, affecting sintering are well known in the field of powder metallurgy and ceramics combustion technology:
particle size of powder; the finer the particles the lower the temperature in the beginning of sintering,
when a mixture of compounds reaches a eutectic temperature in a multi-component system, there will be melt formed in the system, such melt filling the pores between the particles, thereby causing highly effective sintering at a temperature range that can be very narrow indeed.

The components evaporated in the process, such as heavy metals and alkalis, tend to condense or sublimate at a certain temperature characteristic of them. In connection with cooling, there is formed either melt which condenses on the heat transfer surfaces or on the surfaces of dust particles, thereby making them more sticky, or the evaporated components sublimate direct on the heat transfer surfaces. Phenomena of this kind occur, for example, in the alkali by-pass system in the cement kiln, which is why heat recovery is not usually successful in this connection. Corresponding phenomena appear in gasifying processes if the product gas contains alkalis and/or residual tar.

When cooling down close to the solidification temperature, the melt drops in the process gas either easily stick to the existing process particles, thereby contributing to the sticking of dust to the heat transfer surfaces, or solidify direct on the heat transfer surfaces and sinter to them.

In fuming operations, metals are intentionally evaporated from molten slag for recovery. For example, Zn, Pb and Sn are separated from the gas phase after evaporation by changing the oxygen potential i.e. by reburning. Especially fine particles or drops are thus formed in the flue gas. The size of particles in this kind of fume is typically at the range of 0.1 to 1 micron or even smaller. The fume is characterized by an especially large surface activity and tendency to stick to the heat transfer surfaces, thereby impeding the boiler operation. Therefore, a great deal of fuming operations are still carried out without heat recovery.

A phenomenon, much like fuming and nowadays well known, appears in the electric reduction processes of ferromixtures.

For example, in the electric furnace reduction of ferrosilicon and silicon, silicon sublimates at a certain temperature zone as silicon monoxide, which oxidates, for example, in the hood of an open or half-closed furnace to silicon dioxide, forming $SiO_2$-fume in the flue gas. With respect to the boiler operation, $SiO_2$-fume has proved to be extremely difficult at temperatures exceeding 500° C. In practice, almost all silicon and ferrosilicon are still produced without waste heat recovery.

In reduction of ferromixtures and silicon in a closed electric furnace, there are formed variable amounts of silicon monoxide and zinc as well as alkali metal vapours depending on the impurities in the feed materials. In cooling of a gas like this, the temperature of which may be even 1000° to 1300° C. when coming from the process, the silicon monoxide oxidizes to $SiO_2$-fume, and other vapours mentioned above condense either directly on heat transfer surfaces or first as a fume in the flue gas. Thereafter, fumes stick to the heat transfer surfaces, which fairly soon results in decreased efficiency and usually also in clogging of the heat exchanger.

An example of chemical reactions induced by cooling and of fumes resulting from said reactions is the melting of sulphide-based lead concentrates which process generates Pb-PbO-rich flue gas containing $SO_2$ and being of the temperature of 1200° to 1300° C. As the gas is cooling in the boiler, evaporated Pb and PbO begin to condense and, on the other hand, chemical balances change so as to form lead sulphate at the temperature range of about 900° to 500° C., said lead sulphate separating from the gas phase as fume-like particles. At the same time, a great deal of heat is released due to condensation, and reaction heat is released from the sulphatizing reactions. The conditions for sulphatization are advantageous as the hot gas flow contacts heat transfer surfaces with effective cooling and at the same time, the heat transfer surfaces operate as a base onto which the lead sulphate formed separates.

Sintering of particulate material, improved by the sulphatizing reaction appears in most melting processes of sulphide concentrates, whereby vapors, fumes, melt drops or particles of, for example, lead, copper, zinc, nickel and other metals and oxides are formed, which vapors, fumes, melt drops and particles sulphatize as the gas is cooled. As the melting technology has begun to use more and more concentrated oxygen and pure oxygen, local temperature peaks in the process as well as concentrations of sulphur oxides of gases rise, which results in an increased relative significance of the sulphatizing reaction with consequent fouling problems. Another simultaneous phenomenon has been the exploitation of more and more complex and impure deposits, which has, for example, raised zinc and lead contents in copper concentrates, and considerably increased the share of such components that vaporize and sulphatize intensively in process gas particles as well as fouling problems of heat transfer surfaces.

The problems of sulphatizing can somewhat be helped by blowing extra air into the radiation chamber of the boiler. This contributes to a very complete sulphatization already in the radiation chamber. Technically, this is not, however, advantageous to the process as the particulate material from boiler is usually returned to the beginning of the process. In this case, returning of sulphate increases the circulation load of sulphur and the energy consumption of the melting process.

The above gives a fairly clear illustration of the reasons for fouling of the heat transfer surfaces. In this connection, however, there is no reason for a more detailed approach.

Several, means have been suggested to solve the fouling problems of boilers and heat exchangers. The following gives a more detailed description, by way of examples, of such known arrangements that utilize either fluidized bed technique or characteristics of said technique.

U.S. Pat. No. 2,580,635 discloses a method of condensing sublimable compounds evaporated in a gas from said gas as fine particles. In the method described, the gas is cooled by fairly rough solids (grain size appr. 0.7 mm) in a vertical chamber where the gas flows upwards and the solid particles downwards. The solid particles, the grain size of which has to be carefully chosen in proportion to the flow velocity of the gas, are cooled in a separate system and then recirculated to the upper side of the system. The use of the method is limited to condensing of condensable vapors into a fine fume.

U.S. Pat. No. 2,583,013 discloses a method of condensing from a gas such sublimable compounds that have evaporated in said gas. In the method solid particles are fed to the gas flow before the heat exchanger, whereby the gas cools in the heat exchanger in the presence of solid particles, and sublimation takes place on the surface of the solid particles suspended in the gas. The solid particles function as nuclei for sublimable material. They decrease fume formation, contribute to scouring of the heat transfer surfaces and improve heat transfer. Impeccable operation calls for a suspension density exceeding 16 kg/m$^3$ at the heat exchanger and a gas flow velocity of 0.9 to 2.1 m/s.

U.S. Pat. No. 2,721,626 discloses a method of cooling hot gases that contain solid particles and foul heat transfer surfaces by mixing solid particles into the gas flow, said particles being considerably larger in size (e.g. 10 to 20 mesh) than the solid particles present in the gas prior to the cooler and by leading said gas-solids mixture at a high velocity (3 to 23 m/s) through the cooler, whereby the amount and mesh of coarse solids is control ed to cause sufficient abrasion for keeping the heat transfer surfaces clean. After the cooler, original fine particles present in the process gas and the coarse solids added are separated from each other. The use of the method is limited by, for example, the erosion brought by coarse solids, which erosion improves in cleaning but also wears the heat exchanger, thus shortening its lifetime.

U.S. Pat. No. 3,977,846 discloses a method of separating hydrocarbons (tars) from hot gas by condensing hydrocarbons on the surface of particles in a cooled fluidized bed. The method described uses a separate gas as a fluidizing medium and introduces the gas to be treated in a separate duct and through nozzles or openings in said duct to the middle area of the fluidized bed, whereby cooling of the gas and condensation of hydrocarbons take place rapidly so that the hydrocarbons cannot condense on the reactor walls or on the cooling surfaces, which are disposed in a dense fluidized bed below the gas inlet openings. The method is restricted by the following: as the gas to be treated has to be introduced through nozzles or openings, it is applicable only if the gas does not contain any compounds that would sinter at the inlet temperature. Separate fluidizing medium is also an encumbrance. According to experience, disposition of the cooling pipes at the bottom of the fluidized bed foretells considerable costs and, due to erosion caused by the fluidized bed, also safety risks.

U.S. Pat. No. 4,120,668 discloses a method for cooling gas containing melt drops and volatilized components either in a cooled fluidized bed or before heat transfer surfaces by means of circulating particles cooled in a circulating fluidized bed reactor. The process gas itself is used as a fluidizing medium, whereby the need for external gas can be avoided. Furthermore, the level of temperature in the fluidized bed or the ratio of gas flow to particle flow in the circulating fluidized bed reactor have been chosen so that the mixing temperature is below the solidification point of molten and condensating components. In a circulating fluidized bed reactor, particles are introduced into the gas flow through a separate control valve of the fluidized bed reactor, functioning as an intermediate tank, wherefrom particles, at a high velocity (appr. 10 m/s) flow into the process gas flow, thus mixing with the gas to be cooled.

The method relates especially to cooling of the product gas from a pressurized molten salt gasifier. When the method is applied in conditions, at which a high pressure prevails and at which a low eutectic temperature of the particles calls for a relatively low mixing temperature when compared with the gas inlet temperature, it generally results in large particle flows and high suspension densities, which cause erosion problems, for example in the heat exchanger section.

U.S. Pat. No. 4,391,880 discloses methods of separating volatilized catalysts from product gases and of heat recovery by means of cooling the gas flow by mixing colder, cooled catalyst particles with it to such an extent that a desired temperature level can be reached, and by means of separating said particles from the gas flow and by cooling them in a separate fluidized bed cooler before returning the particles to the gas flow. A disadvantage of the system is its being composed of several single processes, between which there are large flows of solid particles.

DE patent publication 3439600 discloses a method of producing and cooling of sulphur-free gas by means of leading the product gases to a fluidized bed. In the method the product gas is led either from above or from the side to a cooled fluidized bed, which is fluidized by an after-cooled and purified product gas. Disposition of heat surfaces in a dense fluidized bed usually results in wearing problems and consequently in safety risks. Leading gas to a dense fluidized bed and using it for fluidization calls for a system where rather big pressure losses have to be won, which again raises the nominal effect.

FI patent. 64997 discloses a method where the temperature of a gas containing melt drops is, before the heat exchanger, lowered below the eutectic temperature range of melt drops by means of mixing solid particles cooled in the heat exchanger, separated from the gas and recirculated, with the gas. In this method, solid particles are simply recycled from the particle separator and instantaneously mixed with the gas in the space above the gas inlet opening.

The method requires a certain minimum process gas flow, on one hand, to prevent particles from flowing out of the system through the gas inlet opening and, on the other hand, to lead the particles with gas flow through the cooler. This is a considerable restriction on the function of the method in practice. Furthermore, one has to consider the possibility of a sudden intermission of the process gas flow which causes the circulating particles in the system to flow down through the gas inlet opening.

Applications where low mixing temperatures are required due to low eutectic temperature of particles and consequently a low mixing temperature, easily result in great densities of mass flow, i.e. over 5 kg/Nm$^3$, which brings about greater pressure losses caused by the system as well as erosion problems.

Furthermore, one has to pay attention to the fact that, in those applications in which a low eutectic temperature or some other reason calls for a low mixing temperature and, on the other hand, a high temperature of heat transfer surfaces, the construction is disadvantageous length (=height) of the heat transfer surface can easily be 20-50 m in length. The high construction together with the high density of the mass flow causes a pronounced meaning of the pressure loss as an obstacle because the pressure loss is proportional to e.g. the height of the heat exchanger.

A well-known and applicable method of cooling process gases is circulating of cooled and purified gas and mixing it with the process gas before the heat exchanger so as to achieve a temperature low enough for eliminating stickiness of particles. Circulating of gas involves three weaknesses:

1. Depending on the inlet, mixing, and outlet temperatures, the amount of gas to be circulated has to be 1.5 to 4 times that of the process gas. Thus, the amount of gas to be treated in the boiler and the gas purifying equipment will be 2.5 to 5 times that of the process gas, which again results in high investment and operating costs.

2. In cooling gas by mixing gas with it, the components, such as alkalis, heavy metals etc., evaporated in the process and condensing or sublimating in the cooling system, form a very finely powdered fume. A finely powdered fume is characterized by a lower sintering temperature than coarser particles of the same material, as earlier stated. Furthermore, the fume is characterized by a tendency to stick to the heat transfer surfaces as also mentioned earlier. Therefore, a mixing temperature low enough, i.e. a sufficient amount of circulating gas has to be used in order to provide a well-functioning arrangement. Separating very finely powdered fumes from large gas flows is technically very difficult. Thus, use of circulating gas means highly expensive arrangements.

3. A large increase in the amount of circulating gas, which for the reasons described above is necessary in practice, considerably lowers the partial pressure of condensing and sublimating components. Consequently, to effect condensation and sublimation, the temperature must be lower than what is necessary with an undiluted or a little diluted gas. This, on the other hand, increases the need for circulating gas.

Spraying of water or some other evaporating liquid into the gas flow has been used in cooling of process gases and hereby cool the gas before the heat exchanger to a temperature low enough with respect to the stickiness of particles. The method has, for example, the following weaknesses:

if water is used, there is a resultant high consumption of water, considerable increase in aqueous vapour content in the gas flow, great change in the oxygen potential and high fume formation producing particulate material that is very difficult to separate, as earlier stated. Due to the lowered temperature level, there is a great decline in the amount of heat that can be recovered, which is why heat recovery is usually disregarded. Water spraying is mostly used merely as a method of cooling the gas before filtering;

in the chemical industry, it is often possible to spray some liquid which is contained in the gas and then condensed from the gas in the process. In other words, it is a process in which the vaporization heat can be utilized. Cooling itself or transfer of heat from the process is effected in a condensor, By spraying the component condensed from the gas, it is easy to regulate the temperature level of the gas in, for example, selective condensation or sublimation without bringing to the gas any foreign components in terms of the process. Like water spraying, this method also involves high fume formation in practice, as to sublimating components. Sublimated fumes can usually be separated only by filtering or by an electric filter.

The above description gives a rather detailed picture of the phenomena associated both with cooling of high-temperature process gases and consequent fouling problems of heat exchangers, which problems again hamper cooling of gas, economically important heat recovery and purifying of gas, the latter being significant both for the process economy as well as in the environmental aspects.

The above also discloses a great number of known methods and their weaknesses.

The purpose of the present invention is to provide a simple and efficient method of cooling gases of high-temperature processes, which gases contain evaporated, molten and/or solid components, and of recovering heat in a most appropriate manner, for example, as a high-pressure or low-pressure steam etc. or by heating the powdered material to be fed in the process or by carrying out a thermal or chemical treatment of the powdered material such as the feed material of the process, by utilizing the heat of the process gas, and of purifying gases by minimizing the formation of finely powdered fumes and by adsorbing fumes, melt drops and particles from the gases to be cooled, and of minimizing the occurrence of non-desirable chemical etc. reactions by cooling the gases at a velocity high enough over the desired temperature range, or of accomplishing some other desired reaction or phenomenon such as a chemical reaction that takes place at a certain temperature, suspension density or within a certain time.

All of the above alternatives are not usually possible in one application.

The method according to the invention is characterized in that with the gas to be treated there are, either simultaneously or at short intervals, mixed both solid particles and gas liquid evaporating at a mixing temperature and that at least one of the components, solid particles or gas, to be mixed with the gas is colder than the gas to be treated.

The apparatus according to the invention for treating process gases is characterized in that there is a mixing chamber fitted in the reactor, said chamber having a downwardly tapering conical bottom with at least one inlet opening at the lower end of the conical bottom or in the immediate vicinity thereof, said opening being purposed for the gas to be mixed with the process gas or for the evaporating liquid, and that in the wall or conical bottom of the mixing chamber there is at least one inlet pipe for the solid particles.

In the method of the invention, mixing of the process gas with gas and solid particles is favourably accomplished so as to cool the process gas from the inlet temperature to the desired mixing temperature at a high velocity, usually at $10^3$–$10^{5°}$ C./s or even more quickly, in the mixing compartment, whereby cooling to the mixing temperature is effected like extinguishing. Cooling from the inlet temperature to the mixing temperature is so quick that there will be no time whatsoever for any undesirable chemical reactions. In the presence of solid particles, condensing and sublimating take place heterogeneously onto the surface of the solids, which prevents formation of fumes that would be created through homogeneous nucleus formation.

The mixing temperature is preferably chosen so that the components and melt drops to be separated (sublimated/condensing from the gas will solidify and the solid particles that possibly sinter will cool below the temperature at which the sintering begins and that possible undesirable chemical reactions induced by the change in temperature will be prevented in the absence of kinetic chances because of the low temperature and that desirable reactions take place at the kinetically favourable temperature range.

The method according to the invention is preferably applied so that the mixture of the process gas cooled to the mixing temperature, the cooling gas heated to the mixing temperature, and the flow of solids will be either a) cooled further to a desired temperature, for example, in a heat exchanger or by mixing cold gas or by spraying liquid which will evaporate, and the solids will be separated from the gas in an appropriate manner, whereafter a suitable amount of them will be returned to the mixing compartment where they will be mixed with the incoming process gas flow, and the gas flow will continue to the next stages of the process, such as after-cleaning, after-cooling, condensing, etc., and after a suitable stage of process, part of the gas flow will possibly be returned (in the form of gas or liquid) to said mixing compartment, where it will be mixed with the incoming gas flow, or b) solids will be separated from the gas flow at a mixing temperature in an appropriate manner, for example, by a cyclone, filter, or electric filter, and solids will be returned either direct or through a potential intermediary cooler back to the mixing compartment, where they will be mixed with the incoming gas flow, and the gas flow will continue to the next stages of the process, such as after-cleaning, after-cooling, condensing, etc. After a suitable stage of process, part of the gas flow will possibly be returned (in the form of gas or liquid) back to said mixing compartment, where it will be mixed with the incoming flow of process gas.

An essential advantage of the method is that, the proportion of the flow of solid particles to the gas flow, both being used for reaching the mixing temperature and at least one of them being colder than the incoming process gas, can be chosen so as to achieve optimal conditions in which on one hand, fume formation will be minimized, i.e. the flow of solid particles is dense enough to function as a heterogeneous nucleus creator, to the surface of which the sublimating and condensing components will "grow", fume particles adsorb and melt drops stick and solidify, and on the other hand, the density of formed suspension will minimize, whereby the harmful phenomena such as great pressure loss, pressure vibrations, wear, slowness of adjustment etc. related to the handling of dense suspension will be minimized or eliminated altogether.

Each characteristic of the present invention will be emphasized depending on the case. For example, when heat recovery is of primary importance, it is natural to strive for the highest possible temperature, within the limits of the operation, in which the force on heat transfer is as big as possible. On the other hand, a sufficient suspension density must, however, be chosen in order to provide efficient adsorption of solidifying melts, fumes, and condensing components and minimize the cost of gas purification. Further, the amount and inlet temperature of the circulating gas affects the total amount of gas flowing through the heat surfaces, the density and the flow velocity of suspension and thereby the heat transfer figure and the total amount and cross section/length relation of the heat transfer surface, which may form a highly essential factor both in terms of structure and pressure losses, as earlier stated.

In special cases, use of liquids containing dissolved salts etc. may be applicable in order to establish a cooling effect. In this case, while the liquid is evaporating in the gas, the compounds dissolved in the liquid may simultaneously be adsorbed in the circulating particles instead of allowing them to form finely powdered particulate material which is difficult to separate.

Hence, the optimum arrangement is affected by so many factors that it is not possible to give a universal equation for calculating such an arrangement. The optimum arrangement has to be found case by case based on known terms. Essential to the present invention is its flexibility in establishing a well-operating arrangement in quite extensive terms.

Furthermore, the method according to the invention is featured by its adjustability regarding the process gas flow. Namely, use of circulating gas enables, if necessary, staying of solids in the circulation even though the flow of the process gas to be cooled will stop. The risk of solids falling out of the cooler is hereby eliminated.

BRIEF DESCRIPTION OF THE DRAWINGS

The operating manner and the advantages of the method are further described by way of example in the accompanying drawings, in which

FIG. 1 illustrates a system according to the invention, in which system the process gas is cooled and heat is recovered therefrom.

Figure 1:
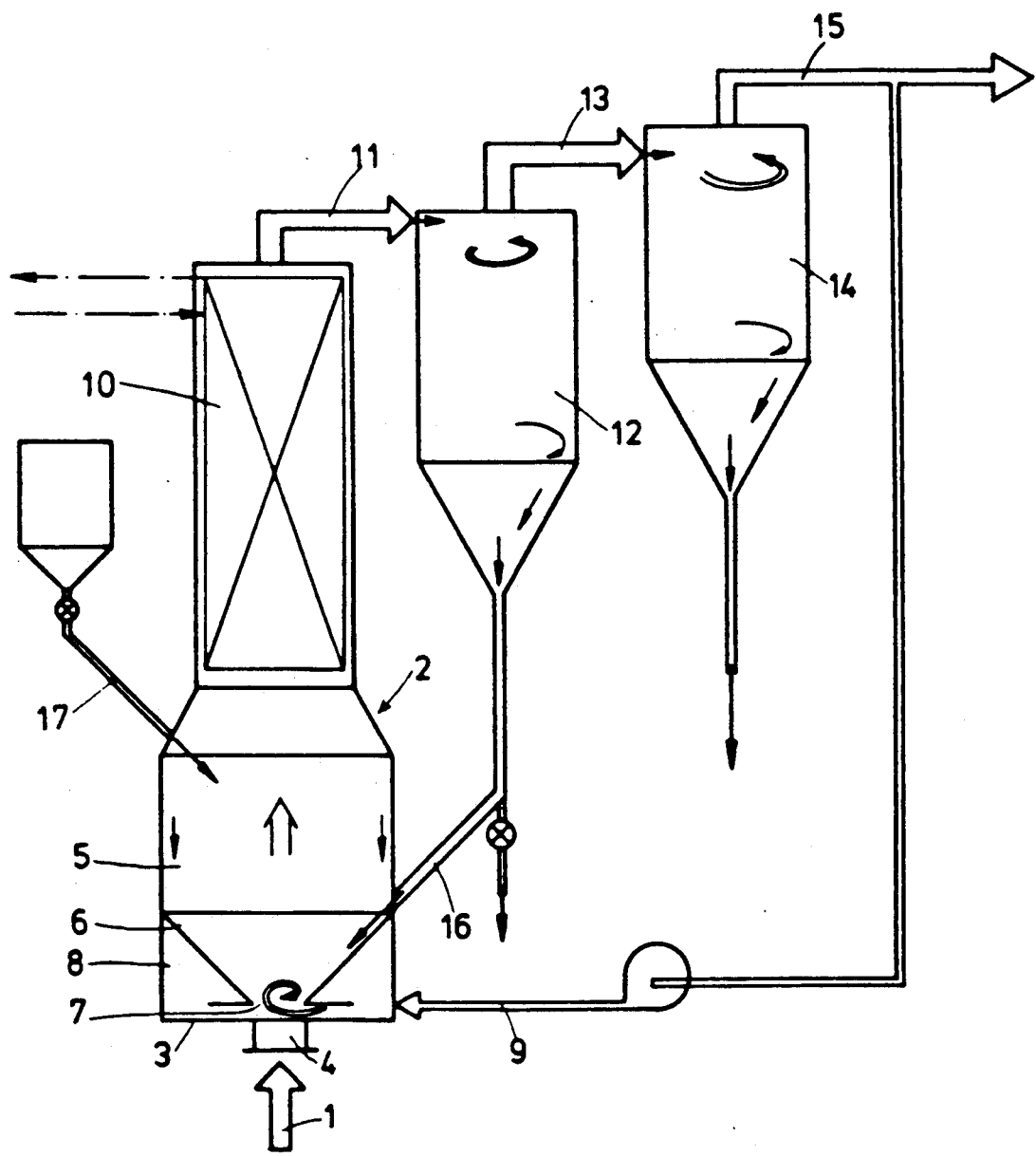
FIG. 1 is a schematic illustration of an application of the method according to the invention.

Process gas 1 is fed into a reactor 2 through an inlet opening 4 at the bottom 3 of said reactor. At the bottom part of the reactor is disposed a mixing chamber 5, at the funnel-type bottom 6 of which chamber there is an opening 7 disposed at a distance from the bottom the reactor. The bottom of the reactor and the bottom of the mixing chamber form an air box 8 between themselves, into which box the cooled circulating gas 9 is fed. At the top part of the reactor is disposed a heat exchanger 10. After the heat exchanger, gas 11 flows to the first cyclone separator 12 in which solid particles will be separated therefrom.

At least part of the solids separated in the first separator is returned to the mixing chamber by means of a return pipe 16. Solids flow down along a slanted surface of the bottom of the return pipe towards the opening 7 where the process gas, cooled gas and returned solids will meet. The gas 13 partly purified in the first separator is led into another cyclone separator 14. Part of the gas 15 purified in the second separator is led into the air box 8 of the reactor. It is also possible to feed new solids to the mixing chamber through a pipe 17.

EXAMPLE 1

In the pressurized systems, the advantages of circulating gas are pronounced. The example below presents a molten salt gasifier mentioned earlier, and let us assume the following:

| | |
|---|---|
| pressure | 10 bar |
| inlet temperature of process gas | 1000° C. |
| mixing temperature before heat surfaces | 600° C. |
| outlet temperature after heat surfaces | 300° C. |
| saturated steam temperature | 280° C. |
| average nominal heat of gas 1000 → 600° C. | 1.6 kJ/Nm$^3$/°C. |
| average nominal heat of circulating particles | 0.8 kJ/kg/°C. |
| inlet temperature of circulating gas | 300° C. |
| average nominal heat of circulating gas 300 → 600° C. | 1.4 kJ/Nm$^3$/°C. |

With relative circulating gas as a variable, the following values are obtained:

| $V_{circulation}/$ $V_{process}$ | $V_{total}$ | particle circulation kg/Nm$^3$ process gas | suspension density | |
|---|---|---|---|---|
| | | | kg/Nm$^3$ | kg/m$^3$ |
| 0.00 | 1.00 | 2.667 | 2.667 | 8.339 |
| 0.25 | 1.25 | 2.229 | 1.783 | 5.777 |
| 0.50 | 1.50 | 1.792 | 1.194 | 3.735 |
| 0.75 | 1.75 | 1.354 | 0.774 | 2.420 |
| 1.00 | 2.00 | 0.917 | 0.458 | 1.433 |

The above table indicates that even as low amount of circulating gas as 75% enables decreasing by 50% the need for circulating particles, whereby the suspension density will fall by nearly a third. With a 100% circulating gas, which is often still quite reasonable, it is possible to decrease the particle circulation to a third and the suspension density to a sixth of the original figures without circulating gas.

With as low as 1 to 5 kg/m$^3$ suspension density, an average particle density around 10$^7$/m$^3$ and even higher is achieved, which normally suffices to bring about the above-mentioned desirable phenomena, i.e. to prevent fume formation and to adsorb ultra-fine particles already formed. By regulating the amounts of circulating gas and particulate material, it is easy to establish such case-by-case optimum conditions that, on one hand, the fume formation will be minimized and on the other hand, the suspension density and circulating particles flow with consequent harmful effects will also be minimized.

EXAMPLE 2

In the example above, the gas inlet temperature 1000° is still quite low. The significance of circulating gas is hereby pronounced, primarily because of pressurizing. For example, in most applications related to melting of sulphide concentrations, the gas inlet temperature ranges from 1200° to 1400° C. and an applicable mixing temperature from 500° to 700° C. Considering the high nominal temperature of gas, the significance of circulating gas can be seen quite clearly also in depressurized systems, as shown by the following example:

| | |
|---|---|
| pressure | 1 bar abs |
| inlet temperature of process gas | 1300° C. |
| mixing temperature before heat surfaces | 600° C. |
| outlet temperature after heat surfaces | 350° C. |
| temperature of saturated steam | 280° C. |
| average nominal heat of gas at the range 1300 → 700° C. | 1.9 kJ/Nm$^3$/°C. |
| average nominal heat of circulating particles | 0.9 kJ/kg/°C. |
| inlet temperature of circulating gas | 350° C. |
| average nominal heat of circulating gas at the range 350 → 700° C. | 1.6 kJ/Nm$^3$/°C. |

| $V_{circulation}/$ $V_{process}$ | $V_{total}$ | particle circulation kg/Nm$^3$ process gas | suspension density | |
|---|---|---|---|---|
| | | | kg/Nm$^3$ | kg/m$^3$ |
| 0.00 | 1.00 | 3.619 | 3.619 | 1.015 |
| 0.25 | 1.25 | 3.175 | 2.540 | 0.713 |
| 0.50 | 1.50 | 2.730 | 1.820 | 0.511 |
| 0.75 | 1.75 | 2.286 | 1.306 | 0.366 |
| 1.00 | 2.00 | 1.841 | 0.921 | 0.258 |

Hence, by the use of circulating gas, the particle circulation can be easily decreased to a half and reach a level of suspension densities that is nearly the same as the sum of emission from the process, which in cases like this is generally 0.1 to 0.5 kg/Nm³. A suspension under 1 kg/Nm³ behaves much like a gas flow, which highly simplifies the implementation of the equipment.

Figure 2:
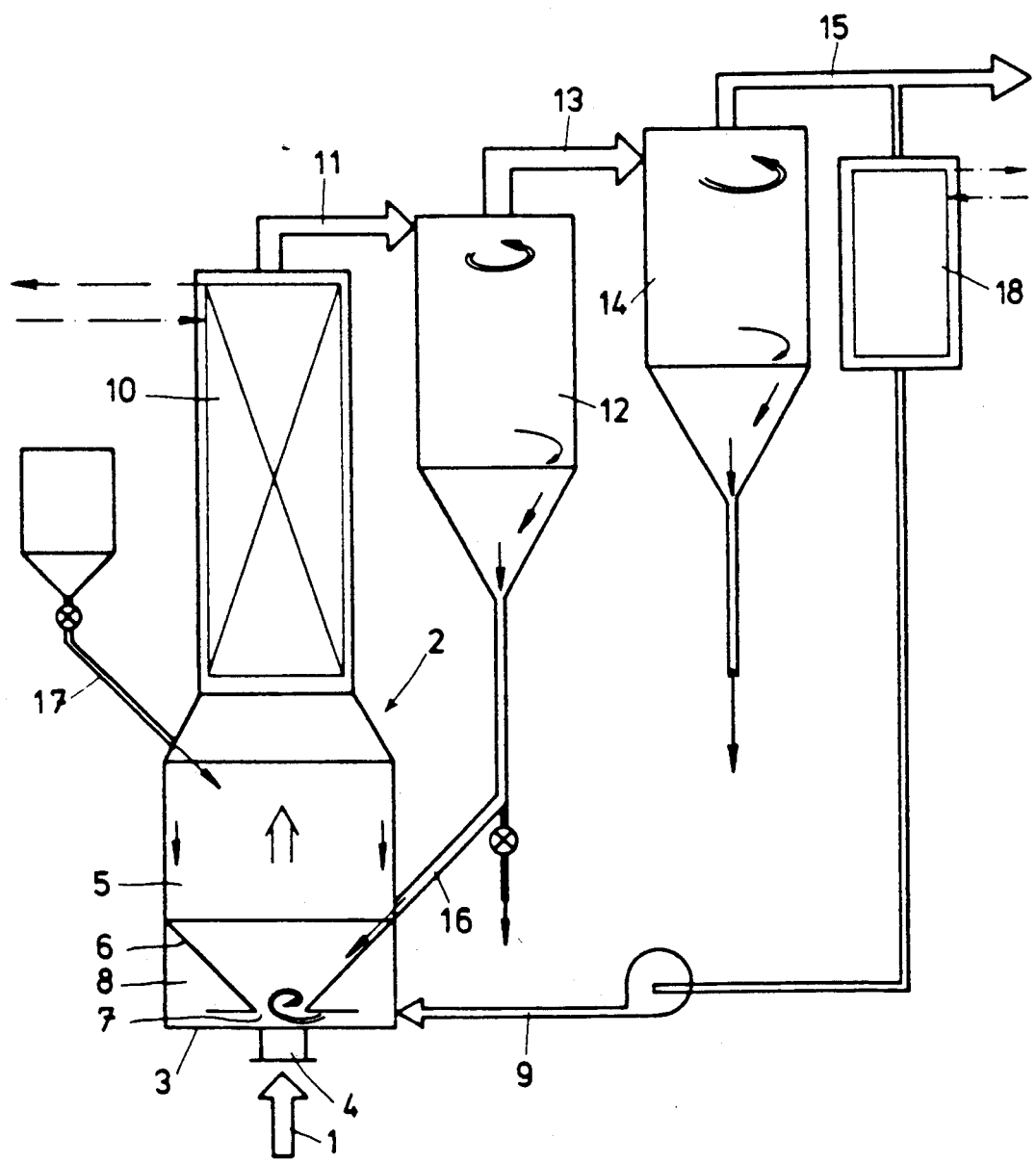
FIG. 2 is an illustration of another application of the method of the invention.

FIG. 2 discloses a circulating gas system where cooling of gas is effected after separation of solid particles, i.e. for purified gas. Here, the method according to the invention is intended for separating evaporated alkalis of cement furnaces from bypass gas, which operation requires a low mixing temperature.

FIG. 2 differs from FIG. 1 only in that the circulating gas 9 is led through an intercooler 18 before feeding said gas to the air box 8 of the reactor 2. For this reason, the same reference numbers denote equivalent parts.

EXAMPLE 3

The following example studies the effect of circulating gas on purifying the alkali bypass gas of a cement furnace as well as in heat recovery:

| | |
|---|---|
| pressure | 1 bar abs |
| inlet temperature of process gas | 1050° C. |
| mixing temperature before heat surfaces | 350° C. |
| outlet temperature after heat surfaces | 250° C. |
| temperature of saturated steam | 180° C. |
| average nominal heat of gas at the range 1050 → 350° C. | 1.8 kJ/kg/°C. |
| average nominal heat of circulating particles | 0.9 kJ/kg/°C. |
| inlet temperature of circulating gas after intercooling | 150° C. |
| average nominal heat of circulating gas at the range 250 → 350° C. | 1.5 kJ/Nm³/°C. |

| $V_{circulation}/V_{process}$ | $V_{total}$ | particle circulation kg/Nm³ process gas | suspension density kg/Nm³ | kg/m³ |
|---|---|---|---|---|
| 0.00 | 1.00 | 14.000 | 14.000 | 6.135 |
| 0.25 | 1.25 | 13.167 | 10.533 | 4.616 |
| 0.50 | 1.50 | 12.333 | 8.222 | 3.603 |
| 0.75 | 1.75 | 11.500 | 6.571 | 2.880 |
| 1.00 | 2.00 | 10.667 | 5.333 | 2.337 |

By the circulating gas, which in this case has simply been subject to intercooling, the suspension density is easy to reduce to such a level where it is possible to eliminate pressure losses and other problems related to the handling of dense suspension at the same time not losing any essential advantages of the system. In this case, intercooling is a highly simple operation because there are no problems with fuel gases of the cement furnace, nor with acid dew points or water dew points for that matter. On the other hand, intercooling is effected with a fairly pure gas, which is why fouling of the intercooler is no problem.

EXAMPLE 4

The chemical industry provides several examples of processes where chemical compounds can be separated from each other by means of selective condensing and/or sublimating. The following gives an example of applying the method of the invention to refining the gas produced in titanium chlorination. Titanium chlorination generates a gas containing several metal chlorides, from which gas selective condensing or sublimating help separate other chlorides, such as MnCl₂, FeCl₃ and AlCl₃ before condensing the main product, i.e. TiCl₄. A small amount of MnCl₂ evaporates, because of its high steam pressure, to the chlorination gas, wherefrom it condenses as an impurity to FeCl₃, thus deteriorating the quality of ferric chloride produced.

The following handles selective separation of MnCl₂ before sublimating of ferric chloride.

| Melting and boiling temperatures (°C.) of chlorides: | | |
|---|---|---|
| | Melting temperature | Boiling temperature |
| MnCl₂ | 650 | 1231 |
| FeCl₃ | 307 | 315 |
| TiCl₆ | −25 | 137 |

In principle, selective sublimation of Mn-chloride is easy because its melting point is over 300° C. higher than the boiling point of ferric chloride. Normally, sublimation of Mn-chloride is effected by spraying a sufficient amount of TiCl₄-liquid into a chlorination gas of around 1000° C. The TiCl₄-liquid hereby evaporates among the gas, thus cooling the gas to about 450° C. Mn-chloride then sublimates as a very fine fume, the separation of which is, in practice, not possible by any simple means such as a cyclone.

Figure 3:
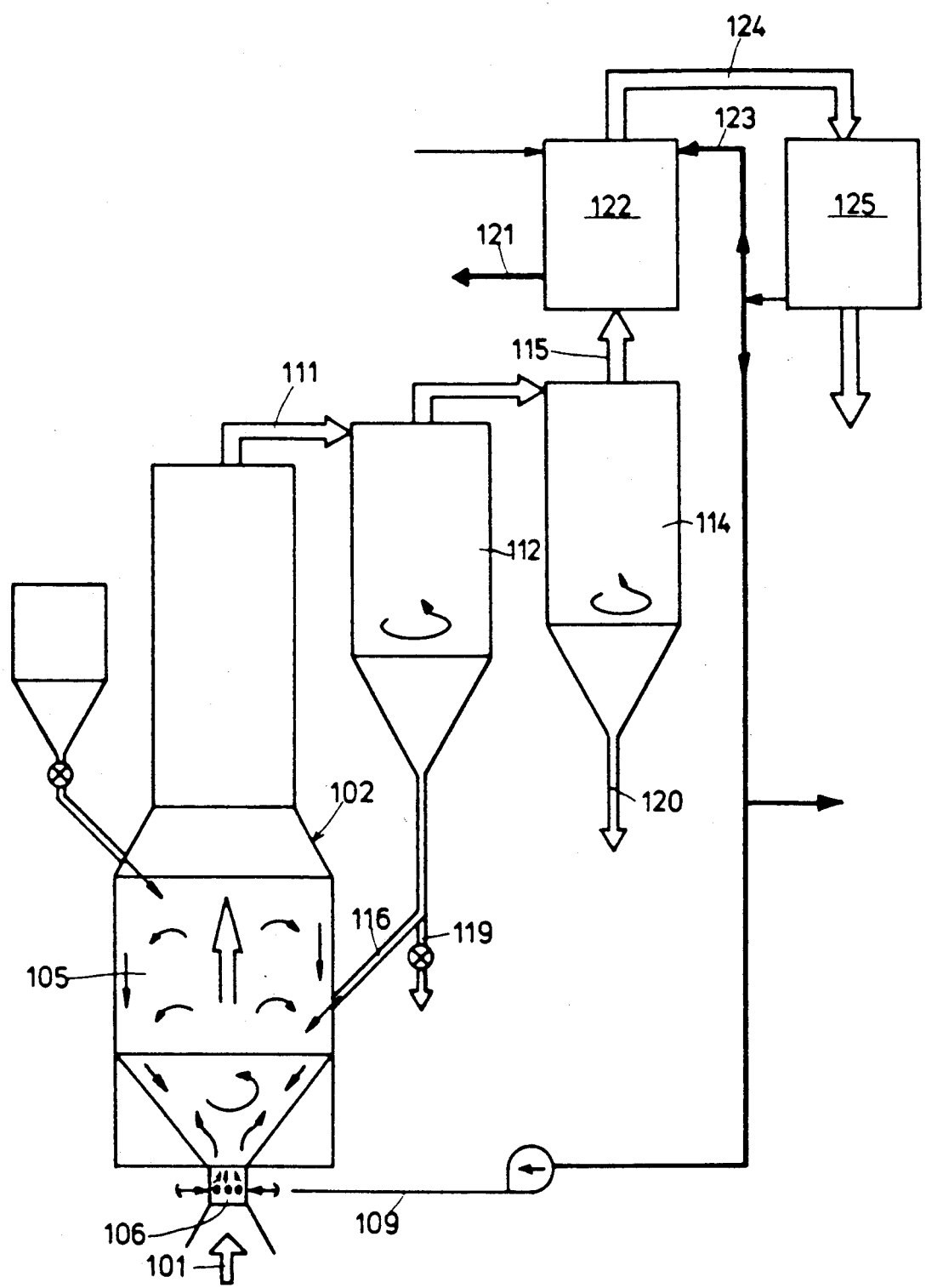
FIG. 3 is an illustration of a third application of the method of the invention.

FIG. 3 illustrates the use of the method according to the invention for selective separation of Mn-chloride and Fe-chloride from the chlorination gas. Gas 101, the temperature of which is 1000° C., is fed to an inlet opening 106 of a mixing chamber 105, to which opening also fluid TiCl₄ 109 is sprayed, which, while evaporating cools the gas. At the same time the gas meets the flow of solid particles containing MnCl₂ particles, which flow is returned from a separator 112 through a return duct 116, whereby sublimation is effected directly onto the surface of the solid particles and formation of fume, which is difficult to separate, is eliminated. Solids contained in the gas 111 leaving the reactor 102 and having been cooled to 450° C. are separated at two stages in separators 112 and 114. Part of the solids separated in the first separator 112 is discharged through a pipe 119 and all solids from the second separator 114 are discharged through a pipe 120. The above provides a simple means of separating MnCl₂ selectively before sublimation of ferric chloride.

Gas 115 leaving the second separator is handled in a corresponding manner (as gas 101) in order to separate ferrite chloride 121 in a system 122, where gas is cooled to about 300° C. by means of fluid TiCl₄ 123. TiCl₄ is separated from the gas 124 leaving the system 122 by means of condensing, in an apparatus 125. Part of the separated Ti-chloride is led to the system 122 and another part to the reactor 102.

In several high temperature processes, the process is fed by a dust-like or pulverous feed material. As an example, let us mention glass melting, flash smelting processes and combustion of cement. In terms of energy economy of the above processes, it would be most reasonable to utilize the heat content of fuel gases in preheating of the feed material. Combustion of cement is a good example of the system which makes use of the heat content of fuel gases in preheating the feed material in so-called cyclone preheaters where precalcination is also effected. Mostly, however, there is such a disproportion that the heat content of the fuel gases is too high for the feed to be mixed with the fuel gases either for reasons related to the process technology or to the terms of operation because the feed material would become too hot and consequently sinter or start, for example, to react, thus losing properties demanded of it. In practice, only a certain part of the fuel gas heat can be utilized in preheating of the feed material. It should be possible to utilize the rest either in preheating of blown air or conventionally in, for example, generating of steam. In some cases, part of the fuel gas heat can also be used for preheating of the blown air. In oxygen blown processes, however, there is no such possibility.

Figure 4:
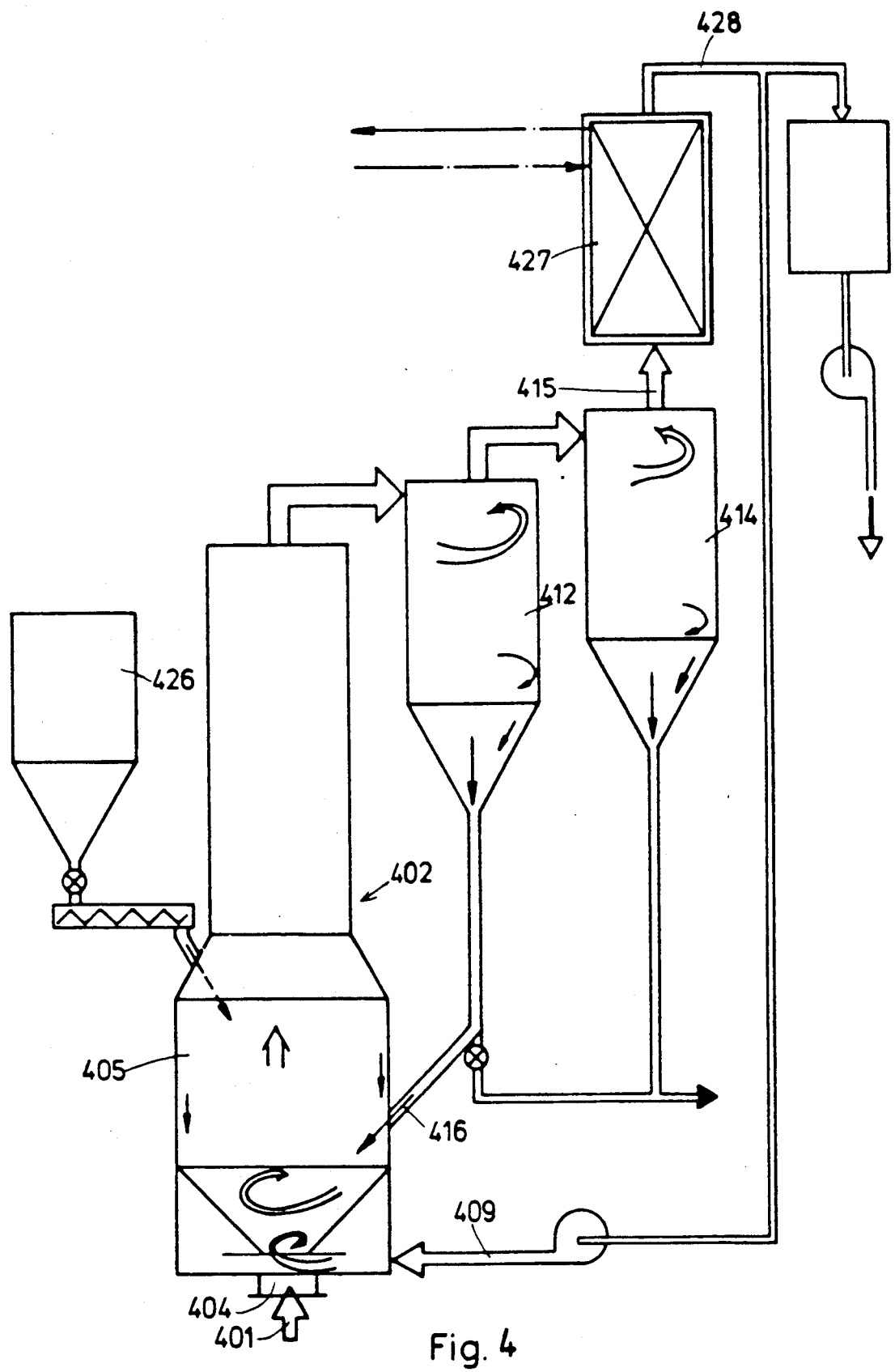
FIG. 4 is an illustration of a fourth application of the method of the invention.

FIG. 4 illustrates using of the method of the present invention for preheating of pulverous feed material. Hot process gas 401 is fed in through an inlet opening 404 of a mixing chamber 405 of the reactor 402, whereafter said process gas meets cooled circulating gas 409 and a solids flow 416 returned from a separator 412. From a silo 426 the pulverous feed material is dosed to a mixing chamber. The gas 415 purified in separators 412 and 414 is cooled in a cooler 427 and part 409 of the cooled gas 428 is led into the reactor. The temperature of the feed material can, by the help of the circulating gas, be easily regulated to an optimal level in terms of the operation, the emission from the process can be separated and returned to the process together with the feed material, and the rest of the waste heat can be utilized in, for example, generating of steam or heating of blown air or both. Because condensing and fume-forming components as well as molten ones are adsorbed from the gas at an early stage of cooling, heat exchange effected through heat transfer surfaces becomes essentially easier and consequently the equipment more favourable in price.

Example of iron manufacturing:

In the field of iron deoxydation, several different methods have been developed in order to replace, for example, blast furnaces in the manufacture of iron. There is an interesting chance to utilize the heat content and deoxydation potential of the discharge gas of a converter that involves bottom blowing by coal and oxygen, in preheating and preoxydation of the process feed material before actual melting and final deoxydation.

Cooling of gas flow produced by a melting process or part of such flow by water spray, steam, or circulation of gas cooled by water spray is known from several connections. A disadvantage of these systems is, for example, changing of the gas analysis and oxygen balances or that the heat content of the gas is not possible to recover, as stated earlier. A further disadvantage, both in gas circulation and in water spraying is that, formation of fumes that are difficult to be separated cannot be prevented, as also stated earlier.

Preheating of the feed material is facilitated by the method of the present invention in the system as shown in FIG. 4. The method of the present invention provides, in connection of the melting and deoxydation process blown by coal and oxygen, opportunity, for example, for the following:
both to regulate the temperature of the discharge gases of the blast furnace blown by coal and oxygen to a desired level
and to adequately purify the gases
and further, to utilize the gases in the pre-reduction of the iron concentrate, which is used as a feed material of the process, before melting and final deoxydation effected in that connection.

In this way, both the heat content and the chemical potential of the process gases can be utilized in the best possible manner and reach the best possible overall energy economy.

Several different process concepts are known in literature which strive for utilizing gases of the coal-oxygen blown melting process in pre-reduction of the process feed material. In these arrangements, it is recommended to cool, purify and reheat the gas before the pre-reduction process. The methods are complicated and, above all, they are too expensive to provide for sufficient economy.

By the method according to the invention, it is possible to simply cool the gases of the blast furnace to a suitable level of temperature in view of the deoxydation process as well as to purify them from fumes awkward to the deoxydation processes before leading the gases to said process by not affecting the analysis of the gas itself. Depending on the deoxydation process used, the gas has to be cooled to a temperature level of 700°-1000° C. The method can be realized by, for example, a plant arrangement as shown in FIG. 2 which, however, need not have heat transfer surfaces at the top of the reactor 2. A suitable circulating particulate material can be chosen case by case, usually so that it is possible to return it to the process together with the particles separated from the process gas. Furthermore, it is possible to choose the circulating particles so that they will not, even at high temperatures, sinter or that it is possible to feed such materials in the circulating particles that prevent sintering of such particles. The advantage of the method is that the temperature of the gas is adjustable according to need, the gas is possible to be purified from fumes, and the heat released in cooling can be utilized in generating process steam or high-pressure steam, not affecting the analysis of the gas itself.

The above discloses application of the method according to the invention to temperature regulating and purifying of the gases of an oxygen-coal blown iron melting reactor before using the gases in the deoxydation process. In this connection, there is also another possibility, which is to some extent analogous with the preheating of the feed material Here the gases of the melting process are led into an apparatus (FIG. 2) according to the invention, where the temperature is regulated suitable for pre-reduction by means of circulating gas and possibly by means of heat surfaces inserted in the circulating fluid bed reactor, and iron concentrate to be pre-reduced is used as circulating particles. The feed of the concentrate and the amount of both the circulating gas and the particles circulated is regulated so as to receive a retention time sufficient for the pre-reduction Thereafter, the hot prereduced material is either fed direct into the blast furnace or it is cooled, possibly turned to brickets and used, after possible storing, for melting. Feed of hot material direct into the melting process is naturally the best way in terms of energy economy. In practice, there may be other factors that speak in favour of cooling and storing.

The gas leaving the pre-reduction stage at the same temperature as the deoxydated concentrate is still CO-$H_2$-rich gas. This gas is further utilized either in preheating, air preheating or production of high-pressure steam.

The examples hereinabove present facilities provided by the method of the invention of utilizing the heat content and chemical potential of the process gases in preheating of the process feed material and in deoxydation. Furthermore, the description presents the possibility of preventing certain reactions by cooling the gases past the desired range of temperature at a high cooling velocity.

The method of the invention also enables accomplishment of desirable reactions, as there is the opportunity to adjusting temperature, the solids retention time and the chemical potential of the gas.

The following gives an example of such an opportunity. For example, flash smelting of impure Cu-concentrates generates a process gas flow containing particles, said particles containing, among other things, precious metals such as Cu, Zn, Pb etc. and in this connection less valuable iron. By regulating the mixing temperature of the gases leaving the process and the temperature of the circulation particles reactor to about 650° to 700° C. and by adjusting the oxygen potential of the reactor to an adequate level by feeding oxygen, for example air, into the circulating gas flow, such conditions are provided in the fluidized bed reactor that the precious metals (Cu, Zn, Pb, etc.) contained in the particulate material of the process gas will form water-soluble sulphates whereas iron will remain in the water in the form of insoluble oxide. For example, the constructive arrangement shown in FIG. 4 can with slight modifications be used for this purpose. The process gas 401 leaving the melting furnace and containing $SO_2$ and particles will be cooled in a mixing chamber 405 by means of circulating gas 409 and air added thereto (not shown in the figure) to a reaction temperature of 650° to 700° C., which temperature also prevails in a reaction zone 402 also serving as a conveying section and in the circulating particles 412 and 416. From the system is discarded as much particles as enter the system with gas and possibly also from the make-up silo 426 for further passage to a dissolving stage. By regulating the amount of particles being circulated and by adjusting the oxygen level by means of adding air and by choosing the level of temperature, the conditions can be made optimal for each case. In this connection, heat generated by the sulphatizing reaction of the melting process can be recovered in the form of, for example, high-pressure steam in the boiler 427.

In preliminary handling of impure Cu-concentrates, for example to remove As, Sb and Bi in a neutral or mildly deoxydating atmosphere, partial calcination at a temperature of about 700° C. is generally used. In that process, the above-mentioned components evaporate as sulphide in the gas phase and will be separated therefrom at a later stage of treating the gas. This treatment can be effected simultaneously with cooling of the gas in the melting furnace by the method of the invention. Pretreatment of the concentrate, i.e. of the feed material of the melting furnace may be effected, for example, by an apparatus as illustrated in FIG. 4, to which apparatus after the heat exchanger 427 has been fitted a separator, heat exchanger and one more separator that is not shown in FIG. 4 for further treatment of the gas. The discharge gas 401 from the melting furnace and the feed material of the process are fed through a silo 426 into the mixing chamber 405 whereto circulating gas 409 is also fed so as to settle the temperature at a correct level. The particles retention time is controlled by regulating the amount of particles being circulated. If necessary, the deoxydation potential of the system allows to be fine-adjusted by feeding, for example, naptha or air to the system either through the circulating gas line or direct to the reactor according to need. The reaction temperature preferably exceeds 700° C. in order to reach a good result in evaporating impurities, but it is also determined by the sintering and other properties of the feed material. The concentrate to be handled as well as separated particles coming from the melting furnace are discharged either hot into the feed material of the melting process, or they are fed into the process cold through cooling and possible storing. Process gas 415, produced at this stage and containing both evaporized impurities in the form of sulphide (As, Sb, Bi . . . ) and possibly small quantities of elementary sulphur, is led to further treatment.

In further treatment, for example, gas is oxidized under control by means of additional air (not illustrated in FIG.) before the heat exchanger 427, whereby the above-mentioned impurities will oxidize and cool to a temperature in which, for example $Sb_2O_3$ and $Bi_2O_3$ will sublimate and become separable from gas. Thereafter, the gas containing $As_2O_3$ will be further cooled in some suitable manner or by, for example, a method according to the invention in a separate apparatus to a temperature of about 120° C., whereby $As_2O_3$ will sublimate and be separated from the gas.

Thereafter, the gases will be led for further treatment in order to produce, for example, sulphur acid.

In the above-mentioned coupling, the heat needed by the process is received from the gases of the melting furnace, whereas in a separate partial calcination, heat has to be generated by oxidizing part of the sulphide of the concentrate. Thus, the heating value of the concentrate is saved for the needs of the melting process itself. At the same time, there has been also gained such an advantage that the number of gas flows to be treated and containing $SO_2$ decreases from two to one and the $SO_2$-content of the gas flow will rise in comparison with the conventional arrangement.

Figure 7:
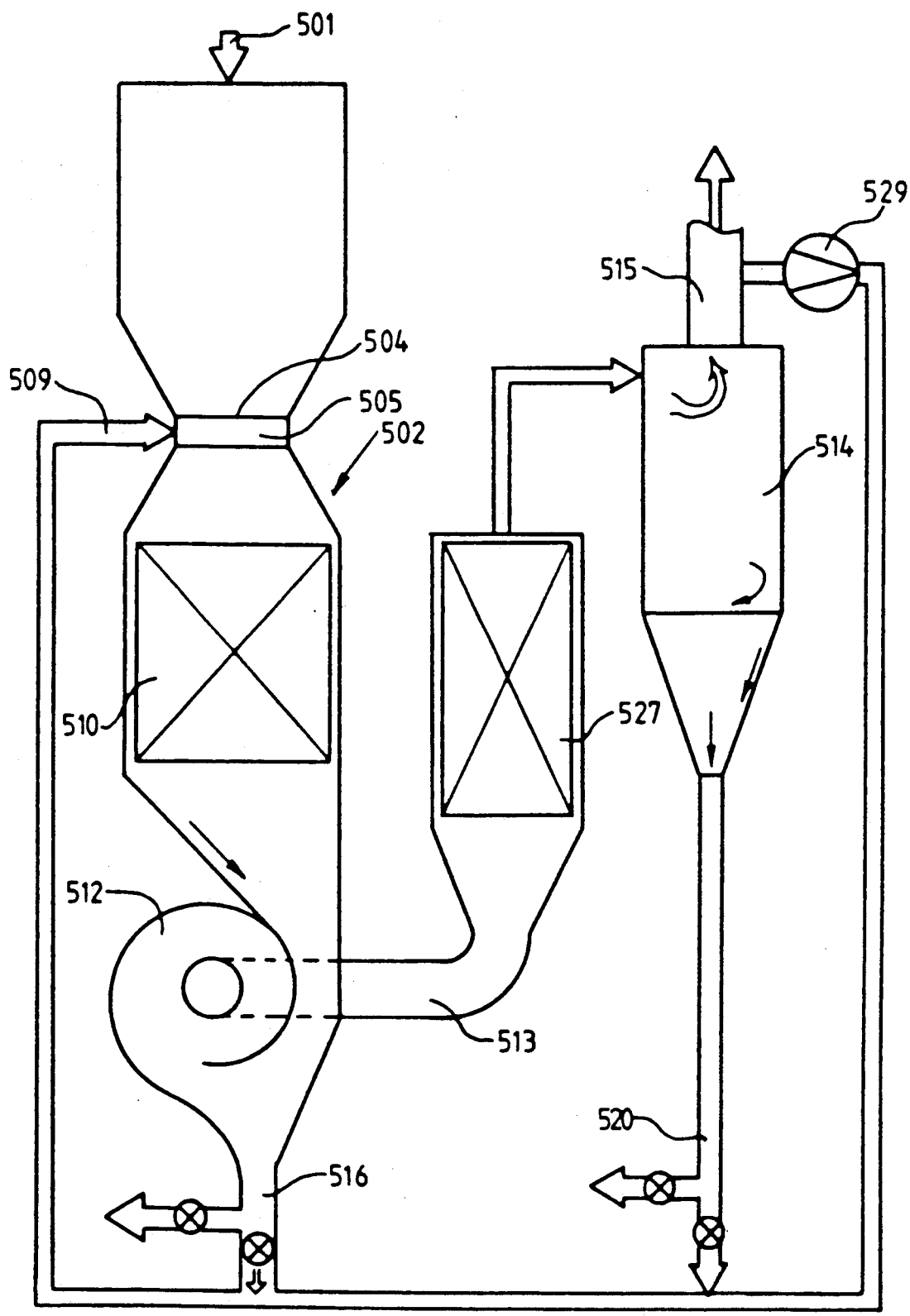
FIG. 7 is an illustration of a fifth application of the method of the invention.

FIG. 7 illustrates a system for treating process gases 501 in a reactor 502, whereto process gas is introduced through an inlet opening 504 disposed in the upper part of said reactor. Circulating gas which has been cooled and circulating particles are also led to the upper part of the reactor. Process gas, circulating gas and circulating particles swiftly mix in the upper part of the reactor at the mixing space 505. The gas/particle suspension that has reached the mixing temperature then flows downstream downwards in the reactor. The embodiment illustrated in FIG. 7 includes a heat exchanger 510 disposed in the bottom part of the reactor, in which heat exchanger heat is recovered from the process gas. Below the reactor is arranged a particle separator 512 where solid particles are separated from the gas/particle suspension. Various known techniques are applicable to particle separation, which can be effected at either one or several stages. In the application illustrated in FIG. 7, gas that has been partly purified is led through a duct 513 to a secondary gas cooler 527 and then to another particle separator 514.

Part of the purified gas 515 is recycled by means of a pump 529 to the upper part of the reactor in the form of circulating gas 509. Prior to leading to the reactor, the circulating gas is mixed with solid particles 516 and 520 separated from either one or both particle separators 512 and 514. Particles may also be returned separated from the gas to the upper part of the reactor, by using various known means of transport such as pneumatics, hoists or elevators, screws etc.

As shown in FIG. 7, heat can be recovered from the process gas in the reactor 502 in the heat exchangers 510. In some applications it may, however, be advantageous to first pre-purify the gas, for example, in the purifier 512 and thereafter lead it through the heat exchanger 527. Especially with great amounts of particles, it may be beneficial to remove wearing material from the gas prior to the heat exchanger. On the other hand, if desired, it is possible to effect heat recovery in the reactor only and leave out the other heat exchanger 527.

With the system illustrated in FIG. 7, it is possible to achieve all the above advantages of the method of the invention, i.e.
rapid cooling
fast suspension formation,
selective condensing etc.

Constructionally, the system differs from earlier applications in that, in previous ones it is mostly necessary to force the solid particles into the gas flow whereas the construction according to the invention brings about spontaneous mixing at the inlet opening.

Further advantages of the system illustrated in FIG. 7 are as follows:
Circulation of particles is easy because the particles flow through the system independently of the process gas flow. The function of the system needs no minimum process gas flow.
No actual mixing chamber is needed
The pressure loss is minimal because throttling at the inlet opening need not be remarkable.

The above description presents several advantages of the method of the present invention. The above examples indicate that a combination of circulating particles and circulating gas optimal can be optimized for each case. This may, however, result in too low an average particle density prevailing in the mixing section as to fume formation and adsorption. This aspect has to be considered in the arrangement. The examples above handled the density of the suspension circulated through the reactor, which density could by means of circulating gas be adjusted to a level of 0.5 kg/m$^3$ and even below that. In this case, the average amount of particles depending on the grain size, is $10^6$/m$^3$ or even less, whereby the average distance between the particles will become as high as 10 mm. Prerequisite for prevention of fume formation and adsorption of ultra fine particles is usually a higher particle density, e.g. $10^7$–$10^8$/m$^3$, at mixing whereby the distance between particles is 5 ... 1 mm. There are several ways of arranging this kind of equipment. A simple and preferred way of implementation is to build the mixing section of the reactor in such a way that either the bigger or the smaller part of the particles therein is in internal circulation in the mixing section and that only part of the particles is led to the flow circulating through the upper part of the reactor which functions as a conveyor. This is simply realized, for example, so that the effective cross section of the mixing section is bigger than that of the conveying section. In this case, the average flow velocity of the mixing section is correspondingly smaller than that of the conveying section whereby the suspension density prevailing in the mixing section will be higher.

Furthermore, the geometry of the mixing section is so arranged that there is formed an internal circulation which is forced to return to the mixing point. In this way, the suspension density of the mixing section and especially of the mixing point allows to be adjusted within a large range. Generally, a suspension density of $10^7$ to $10^8$ particles/m$^3$ is sufficient at the mixing point, whereby the suspension contains, depending on the particle size and nominal weight etc., 10 to 100 kg/m$^3$ of solid particles. Thus, it is not a question of an actual conventional fluidized bed, where the suspension density is hundreds of kilograms/m$^3$ and pressure losses correspondingly at a considerably higher level.

Figure 5:
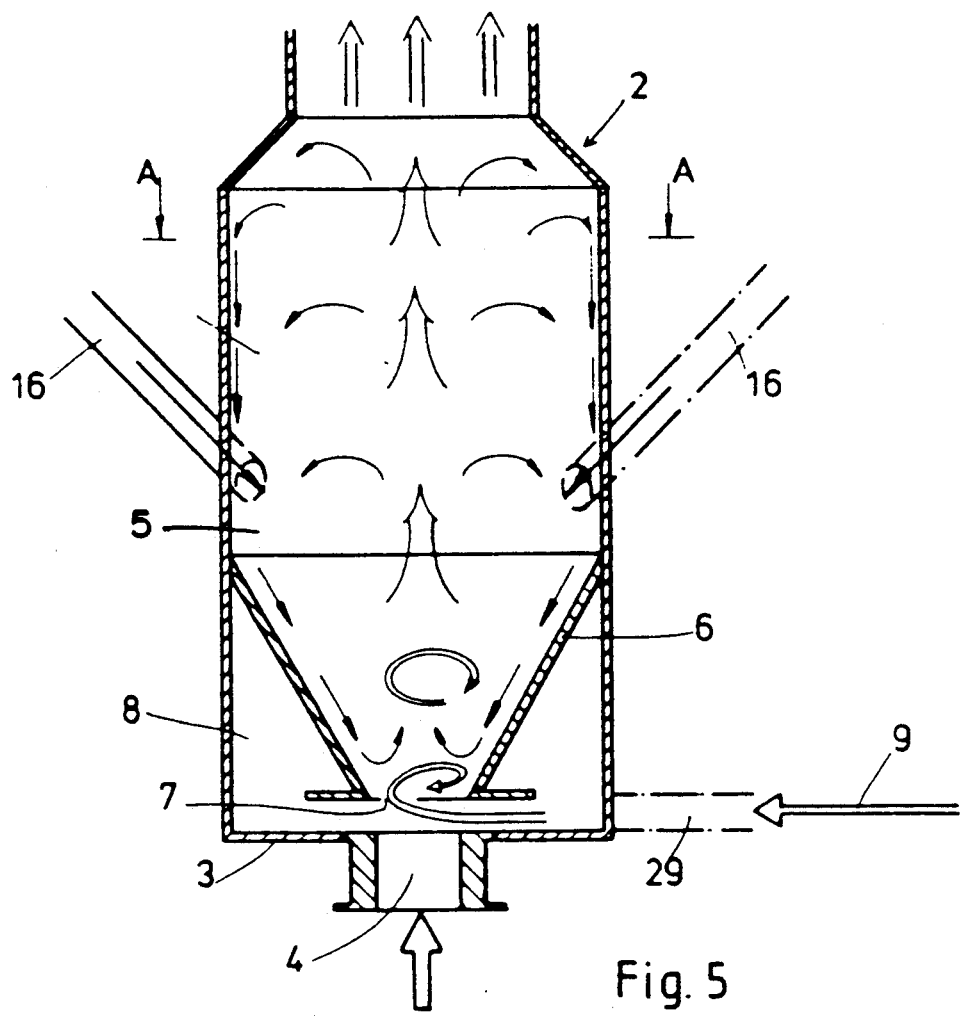
FIG. 5 is a vertical sectional view of a detail of an apparatus for applying the method of the invention.
Figure 6:
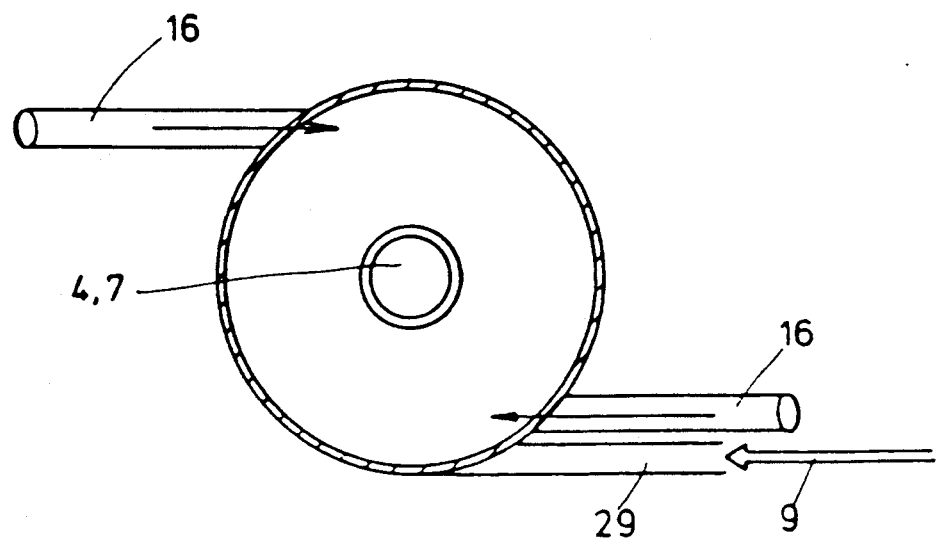
FIG. 6 is a sectional view of FIG. 5 taken along line A—A.

FIG. 5 and 6 illustrate a preferred embodiment of the apparatus according to the invention. Said figures present the lower part of the reactor 2 illustrated in FIG. 1, which lower section comprises the mixing chamber 5, which again comprises a conical bottom 6 tapering downwards, at the lowest point of which there is a gas inlet 7. To the air box 8, formed between the reactor bottom 3 and the mixing chamber bottom, is tangentially connected an inlet pipe 29 for cooling gas 9. To the reactor bottom is centrally fitted an inlet 4 for process gas 1. Return pipes 16 for separated solid particles, connected to the mixing chamber, lead the returned particles in a downwardly circulating movement towards the gas inlet opening 7. The cross surface of the mixing section is bigger than that of the reactor thereabove, which reactor functions as a conveyor.

It is obvious that the mixing section illustrated in FIG. 5 and 6 can also be arranged in another way. Therefore, the conical bottom of the mixing chamber may be provided with openings through which at least part of the gas to be cooled is led. Part of the solid particles may be fed into the mixing chamber through the gas inlet pipe 29.

The operating principle of the mixing section as shown in FIG. 5 and 6 brings out the characteristics of the method of the present invention, such as
a) the suspension density and temperature of the mixing section and especially of the mixing point are adjustable within a large range to a level appropriate for each case,
b) the density and solids flow of the suspension entering the conveyor and the particle separator can be minimized to an optimal level case by case, whereby problems related to a high suspension density, such as wear, system for treating solid particles, pressure losses, etc. will be minimized.

The invention is not limited to the applications and arrangements presented hereinabove, but various modifications, applications and constructions are possible within the inventive scope of the claims.

Although the cooling gas in the application examples is circulating gas, it is obvious that some other appropriate gas, such as air, can be used as a cooling gas. At the mixing temperature at the mixing point, the evaporating liquid can be, for example, water. The method can also be used for the evaporation of liquids and in that connection for the recovery of solids, as stated above.

I claim:

1. A method of treating a process gas by cooling the process gas in a reactor, comprising:
   introducing the process gas to be treated into a mixing chamber in the reactor through an opening in the lowermost end of the mixing chamber for fluidizing solid particles in the mixing chamber and for bringing the process gas into contact with the fluidized solid particles in a mixing stage;
   separating solid particles from the process gas in one or more separators in at least one separation stage following treatment in the mixing chamber; and
   recirculating the separated solid particles into the process gas in the mixing chamber; wherein the process gas is cooled prior to the separation stage; and further wherein the process gas to be treated is mixed in the mixing chamber at a mixing temperature with, in addition to the separated solid particles, process gas which has been treated in the reactor and from which solid particles have been separated after the treatment and/or a fluid condensed from the process gas after the treatment of the gas, which fluid revolatilizes at the mixing temperature and wherein the process gas to be treated and/or the treated process gas and/or the revolatilized fluid act as sole fluidizing gas for the solid particles in the fluidized bed.

2. A method according to claim 1 wherein the process gas is cooled below a phase change temperature of evaporated components discharged from the process gas so that the evaporated components are substantially sublimated onto surfaces of the solid particles.

3. A method according to claim 1 and further including separating fumes from the process gas and wherein cooling the process gas causes the fumes to be substantially adsorbed onto surfaces of the separated solid particles.

4. A method according to claim 1 wherein the process gas is cooled below a phase change temperature of molten components discharged from the process gas so that the molten components are caused to solidify.

5. A method according to claim 4 wherein the molten components solidify onto surfaces of the solid particles.

6. A method according to claim 1 wherein a constant mixing chamber temperature is maintained by regulating amounts of solid particles and/or treated process gas to be mixed with the process gas to be treated.

7. A method according to claim 1 wherein a constant solids suspension density is maintained in the mixing chamber by regulating amounts of solid particles and/or treated process gas to be mixed with the process gas to be treated.

8. A method according to claim 1 wherein the process gas to be treated contains particles which tend to sinter at a sintering temperature and further wherein the process gas is cooled to a temperature below said sintering temperature.

9. A method according to claim 1 wherein the process gas is cooled after the mixing stage by a heat exchanger.

10. A method according to claim 1 wherein the process gas is cooled after said at least one separation stage by a heat exchanger.

11. A method according to claim 1 wherein the process gas to be treated and the treated process gas are brought into contact with each other immediately prior to coming into contact with the separated and recirculated solid particles.

12. A method of treating a process gas by cooling the process gases in a reactor comprising:

introducing the process gas into a mixing chamber in the reactor for fluidizing solid particles in the mixing chamber and for bringing the process gas into contact with the fluidized solid particles in a mixing stage;

separating solid particles from the process gas in one or more separators in at least one separation stage following treatment of the gas in the mixing chamber;

recirculating the separated solid particles into the process gas in the mixing chamber;

cooling at least a portion of the treated process gas after said at least one separation stage so as to cause at least one component in the treated process gas to condense into a fluid and returning said fluid to the mixing chamber where said fluid is evaporated immediately into the process gas at the mixing temperature so as to cool the process gas to be treated, thereby causing evaporated components in the process gas to sublimate onto surfaces of said solid particles.

13. A method of treating a process gas by cooling the process gas in a reactor comprising:

introducing the process gas to be treated as carrier gas into a mixing chamber in the reactor for fluidizing solid particles in the mixing chamber and for bringing the process gas into contact with the fluidized solid particles in a mixing stage;

separating solid particles from the process gas in one or more separators in at least one separation stage following treatment of the gas in the mixing chamber; and recirculating the separated solid particles into the process gas in the mixing chamber; wherein the process gas is cooled prior to the separation stage; and further wherein the process gas to be treated is mixed in the mixing chamber at a mixing temperature with, in addition to the separated solid particles, water condensed from the process gas after treatment of the process gas.

14. A method of treating a process gas by cooling the process gas in a reactor comprising:

introducing the process gas to be treated as carrier gas into a mixing chamber in the reactor for fluidizing solid particles in the mixing chamber and for bringing the process gas into contact with the fluidized solid particles in a mixing stage;

separating solid particles from the process gas in one or more separators in at least one separation stage following treatment of the gas in the mixing chamber; and recirculating the separated solid particle into the process gas in the mixing chamber; wherein the process gas is cooled prior to the separation stage; and further wherein the process gas to be treated is mixed in the mixing chamber at a mixing temperature with, in addition to the separated solid particles, a fluid condensed from the process gas, which fluid evaporates at the mixing temperature, and wherein said fluid contains dissolved salts which adsorb onto surfaces of said solid particles while said fluid is evaporating.

15. A method of treating a process gas by cooling the process gas in a reactor comprising:

introducing the process gas to be treated into a mixing chamber in the reactor for fluidizing solid particles in the mixing chamber and for bringing the process gas into contact with the fluidized solid particles in a mixing stage;

separating solid particles from the process gas in one or more separators in at least one separation stage following treatment of the gas in the mixing chamber; and recirculating the separated solid particle into the process gas in the mixing chamber; wherein the process gas is cooled prior to the separation stage; and further wherein the process gas to be treated is mixed in the mixing chamber at a mixing temperature with, in addition to the separated solid particles,
  (a) process gas which has been treated in the reactor and from which solid particles have been separated after the treatment and/or
  (b) a fluid condensed from the process gas after the treatment of the gas, which fluid revolatilizes at the mixing temperature;
and wherein in the event process gas to be treated is mixed with process gas which has been treated, the treated process gas is mixed with said solid particles immediately prior to mixing with the process gas to be treated.

16. A method of treating a process gas by cooling the process gas in a reactor comprising:
  introducing the process gas to be treated into a mixing chamber in the reactor for fluidizing solid particles in the mixing chamber and for bringing the process gas into contact with the fluidized solid particles in a mixing stage;
  separating solid particles from the process gas in one or more separators in at least one separation stage following treatment of the gas in the mixing chamber; and
  recirculating the separated solid particle into the process gas in the mixing chamber; wherein
  the process gas is cooled prior to the separation stage; and further wherein the process gas to be treated is mixed in the mixing chamber at a mixing temperature with, in addition to the separated solid particles,
    (a) process gas which has been treated in the reactor and from which solid particles have been separated after the treatment and/or
    (b) a fluid condensed from the process gas after the treatment of the gas, which fluid revolatilizes at the mixing temperature;
  and wherein in the event process gas to be treated is mixed with process gas which has been treated, a portion of the separated and recirculated solid particles is mixed with the treated process gas, and another portion of the separated and recirculated solid particles is mixed with the treated process gas, and another portion of the separated and recirculated solid particles is mixed with the process gas to be treated immediately prior to mixing of the treated process gas and the process gas to be treated.

17. A method of treating a process gas by cooling the process gas in a reactor comprising:
  introducing the process gas to be treated into a mixing chamber in the reactor for fluidizing solid particles in the mixing chamber and for bringing the process gas into contact with the fluidized solid particles in a mixing stage;
  separating solid particles from the process gas in one or more separators in at least one separation stage following treatment of the gas in the mixing chamber; and
  recirculating the separated solid particle into the process gas in the mixing chamber; wherein
  the process gas is cooled prior to the separation stage; and further wherein the process gas to be treated is mixed in the mixing chamber at a mixing temperature with, in addition to the separated solid particles,
    (a) process gas which has been treated in the reactor and from which solid particles have been separated after the treatment and/or
    (b) a fluid condensed from the process gas after the treatment of the gas, which fluid revolatilizes at the mixing temperature;
  and wherein in the event process gas to be treated is mixed with process gas which has been treated, the treated process gas is mixed with said solid particles and with the process gas to be treated immediately prior to the process gas to be treated coming into contact with said solid particles.

18. A Method of treating process gases by cooling the process gases in a reactor comprising:
  introducing the process gas into contact with fluidized solid particles, for treatment of the process gas with the solid particles in a mixing chamber;
  separating solid particles from the process gas in one or more separators, in at least one separation stage following treatment of the gas in the mixing chamber and a heat exchanger; and
  recirculating the separated solid particles into the process gas in the mixing chamber; wherein
  the process gas is cooled prior to the separation stage, but after the introduction of separated and recirculated solid particles into the process gas; and further wherein
  the process gas to be treated is mixed in the mixing chamber at a mixing temperature with, in addition to the said separated and recirculated solid particles, process gas which has been treated in the reactor and from which solid particles have been separated after the treatment and/or a fluid condensed from the process gas after the treatment of the gas, which fluid revolatilizes at the mixing temperature.

19. Apparatus for treating a process gas by cooling process gas in the presence of solid particles, which apparatus comprises:
  a vertical reactor having a bottom portion including a first inlet opening for the process gas;
  a mixing chamber arranged within said vertical reactor for mixing the process gas with solid particles, said mixing chamber including
  a conical bottom portion tapering downwardly and inwardly;
  at least one inlet for the process gas at a lowermost end of the conical bottom portion, said inlet being arranged substantially concentrically with the first inlet opening of the vertical reactor;
  at least one inlet pipe for solid particles being recirculated into the mixing chamber;
  an outlet opening in the upper part of the mixing chamber for discharging mixed process gases and solid particles; and
  wherein the vertical reactor includes a second inlet opening for gas or evaporating liquid to be mixed with the process gas in said mixing chamber, located adjacent said conical portion bottom.

20. Apparatus for treating a process gas by cooling process gas in the presence of solid particles, which apparatus comprises:
  a vertical reactor having a bottom portion including a first inlet opening for the process gas;
  a mixing chamber arranged within said vertical reactor for mixing the process gas with solid particles, said mixing chamber including a conical bottom portion tapering downwardly and inwardly;

at least one inlet for the process gas at a lowermost end of the conical bottom portion, said inlet being arranged substantially concentrically with the first inlet opening of the vertical reactor;

at least one inlet pipe for solid particles being recirculated into the mixing chamber;

an outlet opening in the upper part of the mixing chamber for discharging mixed process gases and solid particles; and wherein the vertical reactor includes a second inlet opening for gas or evaporating liquid to be mixed with the process gas in said mixing chamber, located adjacent said inlet for process gas at the lowermost end of the conical bottom portion;

and further wherein the bottom portion of the vertical reactor and the conical bottom portion of the mixing chamber define an air box, and said second inlet opening is fitted tangentially to the air box.

21. Apparatus according to claim 20 wherein the inlet of the conical bottom portion of the mixing chamber is fitted to the lowermost end of the conical bottom concentrically with the first inlet opening at the bottom portion of the vertical reactor and wherein the lowermost end of the conical bottom portion of the mixing chamber is disposed at a distance from the reactor bottom portion.

22. Apparatus according to claim 9 wherein said at least one inlet at the lowermost end of the conical bottom portion of the mixing chamber is operatively connected with said first inlet opening at the bottom portion of the vertical reactor.

23. Apparatus according to claim 20 wherein said inlet pipe is fitted to a wall of the reactor and forms an oblique angle with said wall so as to form a downwardly slanted course for the solid particles as they enter the reactor.

24. Apparatus according to claim 20 wherein said mixing chamber includes an upper part tapering inwardly towards the top of the chamber.

* * * * *